United States Patent [19]

Dubuit

[11] Patent Number: 5,114,525
[45] Date of Patent: May 19, 1992

[54] MACHINE FOR FROSTING GLASS ARTICLES

[75] Inventor: Jean-Louis Dubuit, Paris, France

[73] Assignee: Societe Nouvelle C.T.A., France

[21] Appl. No.: 629,712

[22] Filed: Dec. 18, 1990

[30] Foreign Application Priority Data

Dec. 26, 1989 [FR] France .................. 89 17172

[51] Int. Cl.⁵ ................ B44C 1/22; C03C 15/00; C03C 25/06
[52] U.S. Cl. ................................ 156/345; 156/663
[58] Field of Search ............. 156/345, 663, 640; 65/31; 134/131, 198–200

[56] References Cited

U.S. PATENT DOCUMENTS

| | | | |
|---|---|---|---|
| 2,166,428 | 7/1939 | Du Bois | 41/9 |
| 3,711,263 | 1/1973 | Leger | 65/31 |
| 3,839,113 | 10/1974 | Yoshida | 156/24 |

FOREIGN PATENT DOCUMENTS

| | | |
|---|---|---|
| 2517504 | 7/1976 | Fed. Rep. of Germany . |
| 1336023 | 7/1963 | France . |
| 2477526 | 8/1983 | France . |
| 2174352 | 11/1986 | United Kingdom . |

*Primary Examiner*—William A. Powell
*Attorney, Agent, or Firm*—Longacre & White

[57] ABSTRACT

This is a frosting machine of the kind comprising, traversed by a conveyor (14) adapted to drive the articles (10) to be frosted, at least one treatment station (15A) at which said articles (10) are treated with a liquid.

According to the invention, and in combination, said treatment station (15A) comprises at least one spray manifold (18) adapted to spray the liquid concerned, and at said treatment station (15A) are operative rotator means (14, 34) adapted to rotate the articles (10) on themselves in the jet of liquid sprayed by said spray ramp (18).

Application, in particular, to frosting bottles.

12 Claims, 2 Drawing Sheets

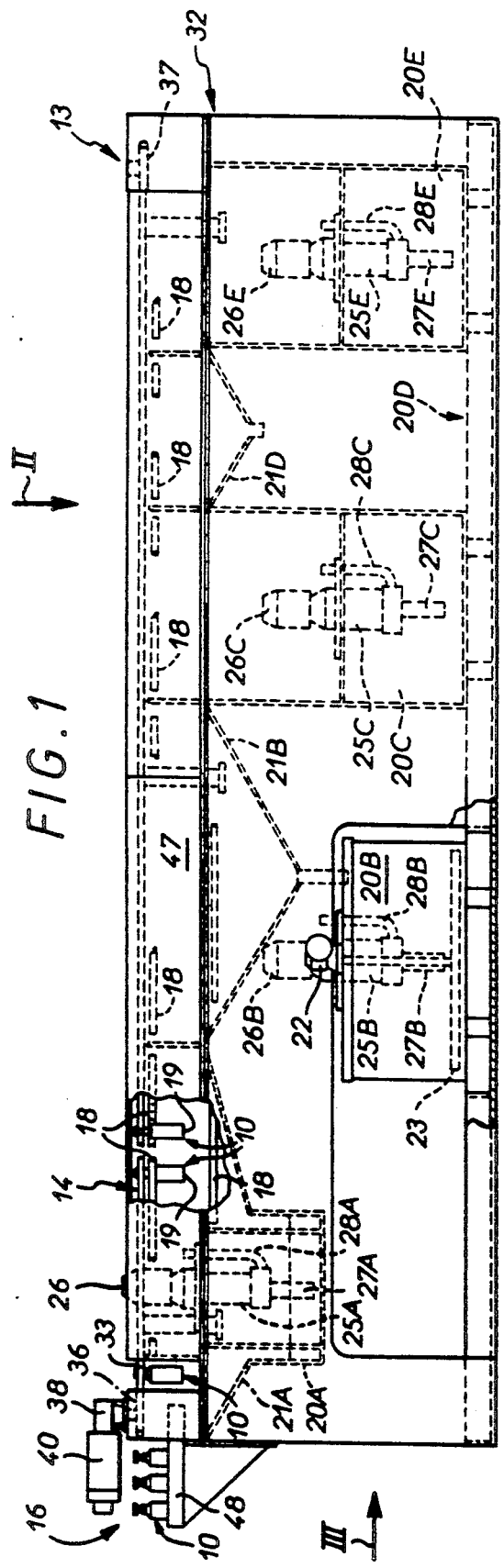
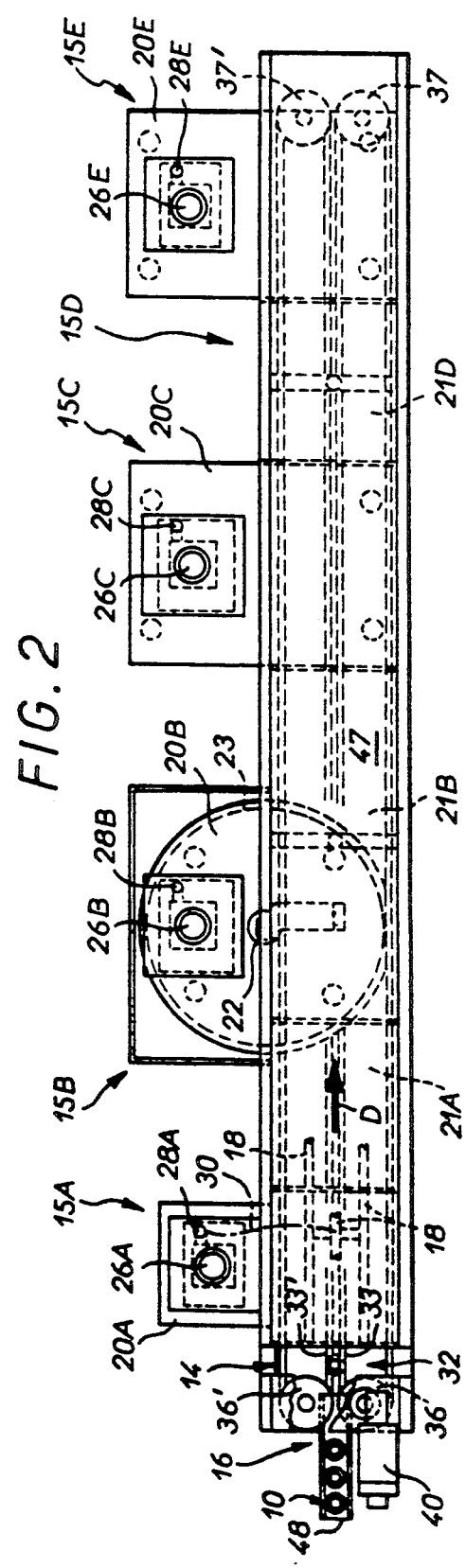
FIG.1
FIG.2

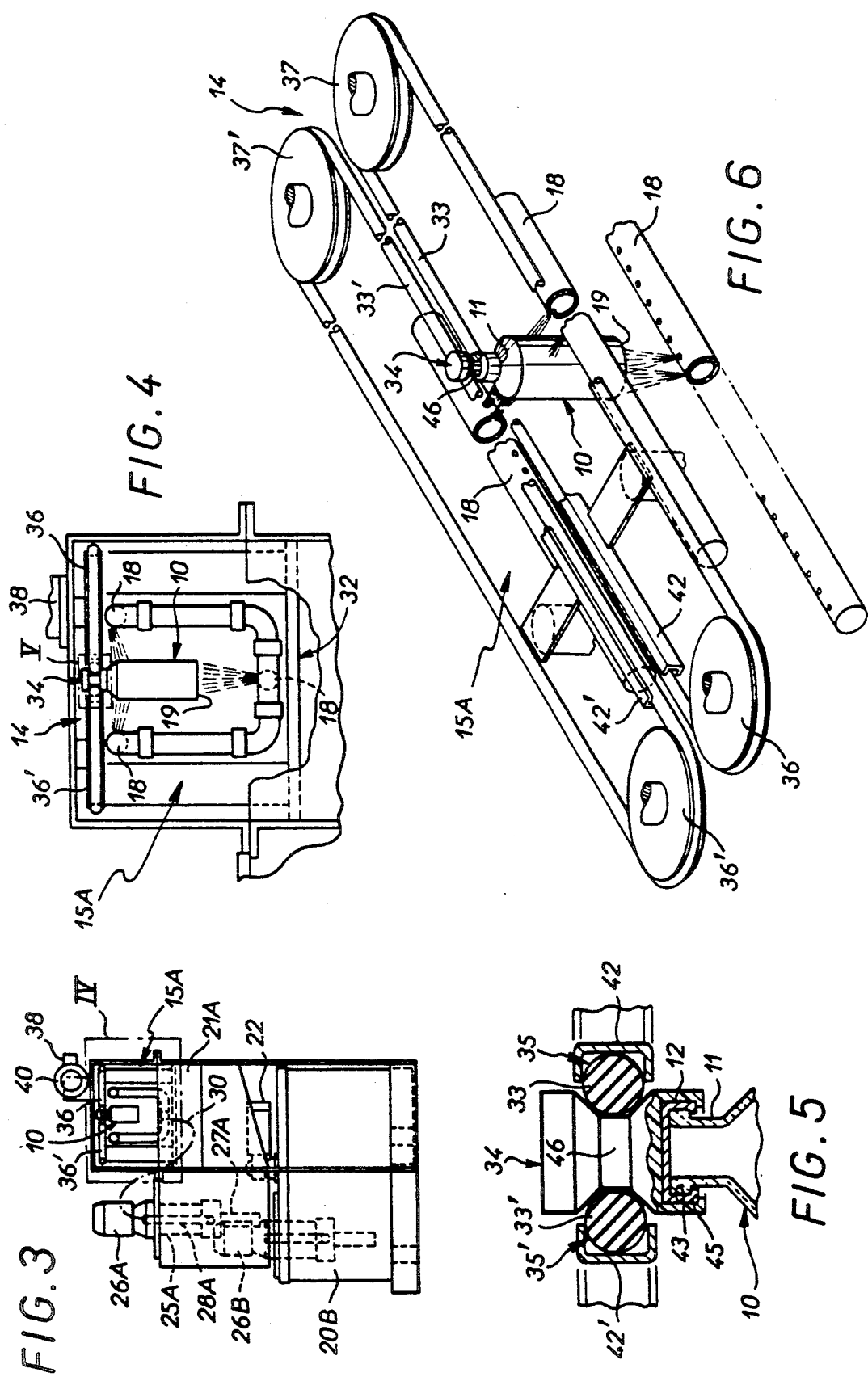

MACHINE FOR FROSTING GLASS ARTICLES

The present invention is generally concerned with frosting glass articles, such as bottles, for example, as may be required in some industries, such as the perfume industry, for example, in particular for esthetic reasons specific to such articles.

Frosting is conventionally achieved by chemical means, using an etching liquid, in practise an acid.

The conventional method is based on immersion.

This is the case in the machine which is the subject of published French patent No 2.477.526.

One of the problems to be overcome in this case is that the acid employed, which is usually ammonium bifluoride commonly referred to by the trade name "LERITE", tends to settle in use so that, to prevent it solidifying, it is necessary to provide an agitator at the bottom of the tank.

Apart from the fact that it is slow, the immersion method requires large volumes of reagent, usually well in excess of 500 liters.

The resulting equipment cost, that is the cost of the tank itself and the agitator, is considerable, even more so because the material must usually be stainless steel to resist abrasion accentuated by the presence of glass residues.

As the immersion process also requires the conveyor to pass through the liquid, this requirement applies also to the conveyor, implying a further increase in cost.

Failing this, the conveyor inevitably wears quickly with the result that it malfunctions and this compromises the overall productivity.

A general object of the present invention is an arrangement enabling these drawbacks to be avoided and which additionally confers other advantages.

To be more precise, its object consists in a machine for frosting glass articles, of the kind comprising, traversed by a conveyor adapted to drive the articles to be frosted, at least one treatment station at which said articles are treated with a liquid, characterized in that, in combination, said treatment station comprises at least one spray manifold adapted to spray the liquid concerned, at said treatment station are operative rotator means adapted to rotate the articles on themselves in the jet of liquid sprayed by said spray manifold, said rotator means being provided by the conveyor, and, the articles to be frosted being bottles, they are attached to supports forming caps which are adapted to be attached to their neck and which, for cooperation with said conveyor, comprise an annular groove.

The invention thus substitutes spraying for immersion combined with rotation of the articles to be treated upon themselves.

A first advantageous result of this is a significant reduction in the quantity of reagent used.

The reagent can be systematically recycled, subject to periodic regeneration.

Another advantageous result is an overall simplification of the equipment.

A simple recovery tank of reduced size (in the order of 100 liters, for example) and with a cylindrical contour disposed below the spraying manifolds is an adequate replacement for an immersion tank.

As the quantity of reagent present in the recovery tank at any time is small, it is easier to agitate the reagent and the agitator employed for this purpose is therefore simpler and less costly to manufacture.

Furthermore, as the conditions under which the equipment operates are less severe, the equipment, and the conveyor in particular, can advantageously be made from synthetic materials.

Finally, the throughput of the system is advantageously substantially greater than that of an immersion process.

Because supports (caps in this case) are disposed between the conveyor and the articles to be frosted (bottles in this case), the conveyor and therefore the machine as a whole are advantageously suited to processing any type of bottle.

All that is required is that the exterior diameter of the caps is matched to the conveyor and their interior diameter is matched to the bottles.

The conveyor is therefore a general purpose conveyor, subject to selecting the appropriate caps.

The characteristics and advantages of the invention will emerge from the following description given by way of example only with reference to the appended diagrammatic drawings in which:

FIG. 1 is a locally cut away view in elevation of a machine in accordance with the invention;

FIG. 2 is a locally cut away plan view of it as seen in the direction of the arrow II in FIG. 1;

FIG. 3 is an end view of it as seen in the direction of the arrow III in FIG. 1;

FIG. 4 is a partially cut away view to a larger scale of the part of FIG. 3 identified by the rectangle IV;

FIG. 5 is a partial view in transverse cross-section and to a still larger scale of the part of FIG. 4 identified by the rectangle V;

FIG. 6 is a perspective view to a different scale showing the spraying and rotation process employed in the machine in accordance with the invention.

As shown in the figures, the glass articles to be frosted are bottles 10, to be more precise, and as is seen more clearly in FIG. 5, bottles 10 whose neck 11 incorporates an outwardly projecting annular bead 12.

The machine 13 in accordance with the invention for frosting the bottles 10 comprises, in the known way, at least one treatment station 15A, 15B, 15C, 15D, 15E at which the bottles 10 are treated with a liquid, and a conveyor 13 feeding the bottles 10 through these stations, as will be described in more detail later.

In the embodiment shown the frosting machine 13 in accordance with the invention in practise comprises, aligned with each other on the downstream side of a loading station 16, a plurality of treatment stations in succession consisting of a cleaning station 15A, a frosting station 15B and three rinsing stations 15C, 15D and 15E.

According to the invention, and in conjunction, each of the treatment stations 15A, 15B, 15C, 15D, 15E comprises at least one spray manifold 18 adapted to spray liquid, i.e. reagent at the cleaning station 15A and the frosting station 15B or water at the rinsing stations 15C, 15D, 15E, and rotator means operate at each treatment station 15A, 15B, 15C, 15D, 15E, in a manner to be described in more detail later, to rotate the bottles 10 on themselves in the jet of liquid sprayed by the spray manifold 18.

The spray manifold in practise extends along the direction of advance D of the conveyor 14, that is to say along the direction in which the treatment stations 15A, 15B, 15C, 15D, 15E are aligned. As will emerge later, the conveyor 14 is adapted to convey the bottles 10 suspended from it and there are therefore at each treatment station 15A, 15B, 15C, 15D, 15E three spray manifolds 18, namely two spray manifolds 18 adapted to spray the bottles 10 from the side, one on each side at the level of the base of their neck 11, for example, and a third spray manifold 18 adapted to spray their bottom 19 from below.

The three spray manifolds 18 are interconnected, of course.

Below the three spray manifolds 18 at each treatment station 15A, 15B, 15C, 15D, 15E there is provided a respective collection tank 20A, 20B, 20C, 20D and 20E.

At the cleaning station 15A, where the liquid employed is hydrochloric acid, for example, the collection tank 20A is in one piece with a funnel 21A adapted to direct this liquid onto it.

At the frosting station 15B, where the liquid employed is "LERITE", for example, the recovery tank 20B is separate from the corresponding funnel 21B.

It is in practise a cylindrical tank at the bottom of which, driven by a motor-gearbox 22, is an agitator 23.

No funnel is used at the rinsing station 15C, where the liquid employed is water which, being recycled as will be explained later, is inevitably acidulated.

The same applies to the rinsing station 15E, where the liquid employed is recycled distilled water.

However, at the rinsing station 15D between the two previously described, where the liquid used is tap water, a funnel 21D is employed, the corresponding recovery tank 20D running along the full length of the base of the machine.

Except for the intermediate rinsing station 15D, the spray manifolds 18 of the various treatment stations 15A, 15B, 15C, 15E are fed by recycling means dipping into the collection tank 20A, 20B, 20C, 20E.

These recycling means in practise employ a pump 25A, 25B, 25C, 25E driven by a motor-gearbox 26A, 26B, 26C, 26E and whose inlet 27A, 27B, 27C, 27E dips into the collection tank 20A, 20B, 20C, 20E. As shown by the chain-dotted line 30 for the cleaning station 15A in FIGS. 2 and 3, the discharge 28A, 2B, 28C, 28E is connected the appropriate spray manifold 18.

In the embodiment shown, the recovery tanks 20A, 20B, 20C, 20D, 20E and the funnels 21A, 21B, 21D are disposed under a table 32 which forms part of the frame of the machine and from which are suspended the funnels 21A, 21B, 21D and the recovery tank 20A of the cleaning station 15A.

The conveyor 14 runs above the table 32 and is supported by it.

It has two parallel runs 33 and 33' between which are gripped supports 35 to which the bottles 10 can be coupled.

In accordance with the invention, the rotator means for rotating the bottles 10 on themselves are provided by the conveyor 14.

This is because, at least in contact with the runs 33 and 33' of the conveyor 14, the supports have a circular transverse cross-section and because at least one of the runs 33 and 33' (the run 33 in this case) is part of an endless belt 35 running around two pulleys 36 and 37 of which the pulley 36 is a drive pulley coupled through a direction changer unit 38 to the output shaft of a motor-gearbox 40.

The motor-gearbox 40 is preferably a variable speed unit.

In the embodiment shown the other run of the conveyor 14 (the run 33' in this case) is also part of an endless belt 35' running around two pulleys 36' and 37'.

The belt 35' is not acted on by any drive means, however.

The run 33' could therefore be replaced with a fixed bar, if required.

Due to the driving effect of the run 33, the supports 34 roll along the run 33' which simultaneously drives them along the latter, and therefore drives the bottles 10 suspended therefrom in the direction D, and rotates the bottles 10 upon themselves.

In the embodiment shown each of the runs 33 and 33' of the conveyor 14 is stiffened by a respective fixed guide 42 and 42' on the side opposite the other run.

As shown, these are simple U-section extrusions, for example, in which the runs 33 and 33' are accommodated.

According to the invention, the supports 34 from which the bottles 10 to be frosted are suspended are caps adapted to be attached to the neck 11 of the bottles 10.

As shown in FIG. 5, by way of example, the supports 34 include a housing 43 on their lower surface adapted to engage the neck 11 of a bottle 10 lined with an elastic material 45 adapted to grip the neck 11 by means of the bead 12, snap-fastener fashion.

For cooperation with the runs 33 and 33' of the conveyor 14 the supports 34, which are generally cylindrical, have an annular groove 46 on their lateral surface.

They are therefore directly engaged with the conveyor 14.

In the embodiment shown a tunnel-shape cover 47 covers the conveyor 14 over the entire length of the frosting machine 13 from the cleaning station 15A.

Finally, in the embodiment shown, the bottles 10 to be frosted are initially placed in a chute 48 at the loading station 16.

Once fitted with a support 34, the bottles 10 are engaged one by one between the two runs 33 and 33' of the conveyor 14.

By virtue of the process already outlined, they then pass of their own accord through the entire frosting machine 13, to be offloaded from the conveyor 14 at the other end of the machine.

As they pass through the machine, in each treatment station 15A, 15B, 15C, 15D, 15E they are sprayed with liquid (reagent or water) by the spray manifold 18 of the treatment station 15A, 15B, 15C, 15D, 15E as schematically represented in FIGS. 4 and 6 in the case of the cleaning station 15A.

Because the bottles 10 rotate on themselves, the liquid sprayed onto them runs over all of their surface.

By varying the rotation speed of the pulley 36 driving the run 33 of the conveyor 14 it is possible to control the speed at which the bottles 10 rotate on themselves and the speed at which they are driven through the treatment stations 15A, 15B, 15C, 15D, 15E in order to control the time for which they are treated in each of the treatment stations 15A, 15B, 15C, 15D, 15E according to the respective length thereof.

Although described so far as being fixed, it is equally feasible, for this purpose, to render the run 33' of the conveyor 14 mobile in either direction.

The present invention is not limited to the embodiment described and shown, but encompasses any variant execution thereof.

I claim:

1. A frosting machine for necked bottles comprising at least one operating station including at least one spray manifold for spraying a liquid for use in frosting, a conveyor for conveying bottles to be frosted through said operating station, said conveyor including rotator means for rotating bottles about axes thereof in said liquid sprayed by said spray manifold, each said rotator means including a caplike support member in engagement with a neck of the corresponding bottle and an annular groove in cooperative engagement with said conveyor whereby the bottle rotates as it is conveyed through the operating station.

2. A frosting machine according to claim 1, wherein said conveyor comprises a pair of parallel runs engageable in said groove for gripping said rotator means therebetween, said rotator means being of circular cross section, at least one of said runs being part of an endless belt running over two pulleys, one of said pulleys being a drive pulley.

3. A frosting machine according to claim 2, wherein said drive pulley is connected for rotation with an output shaft of a variable speed motor gearbox.

4. A frosting machine according to claim 2, wherein the other of said runs of said conveyor is part of an endless belt running over two pulleys.

5. A frosting machine according to claim 1, further comprising a guide member disposed on the side of said one run remote from the other of said runs of the conveyor for supporting said one run.

6. A frosting machine according to claim 1, wherein said conveyor having a direction of displacement through said operating station, said spray manifold extending generally parallel to said direction of displacement, and spray ports in said spray manifold directed transversely to the direction of displacement.

7. A frosting machine according to claim 1, further comprising a recovery tank for liquid disposed beneath said spray manifold, liquid recycling means for returning recovered liquid from said recovery tank for use in said spray manifold.

8. A frosting machine according to claim 1, wherein said caplike rotator means is adapted to suspend the corresponding bottle therefrom.

9. A frosting machine according to claim 8, wherein three said spray manifolds are provided, two of said spray manifolds being disposed on opposite sides of a path of movement of the bottles through said operating station for spraying sides of the bottles and a third one of said spray manifolds being disposed below the path of movement of said bottles through said operating station for spraying the bottom of the bottles.

10. A frosting machine according to claim 1, wherein said operating station is a frosting station, and further comprising a cleaning station upstream of said frosting station and a rinsing station downstream of said frosting station relative to a direction of displacement of bottles through said frosting station, said conveyor extruding in succession through said cleaning, frosting and rinsing stations.

11. A frosting machine according to claim 10, wherein the bottles are carried by the rotator means along substantially the entire conveyor.

12. A frosting machine according to claim 10, wherein three said rinsing stations are provided, comprising a first rinsing station supplied with recycled water, a second rinsing station supplied with tap water, and a third rinsing station supplied with distilled water.

* * * * *